W. A. INGALLS.
Links.

No. 167,453. Patented Sept. 7, 1875.

Witnesses:
Julius Wilcke
J. T. Whipple

Inventor:
William A. Ingalls
By Sherburne & Co.
Attys.

UNITED STATES PATENT OFFICE.

WILLIAM A. INGALLS, OF ALTON, ASSIGNOR TO RUTHVEN W. PIKE, OF CHICAGO, ILLINOIS.

IMPROVEMENT IN LINKS.

Specification forming part of Letters Patent No. 167,453, dated September 7, 1875; application filed April 8, 1875.

*To all whom it may concern:*

Be it known that I, WILLIAM A. INGALLS, of Alton, in the county of Madison and State of Illinois, have invented a new and useful Universal Link; and I do hereby declare the following to be a full, clear, and exact description thereof, which will enable others skilled in the art to which it appertains to make and use the same, reference being had to the accompanying drawing, forming part of this specification.

My invention has for its object to provide a link adapted for use in the construction or repairing of chains, as well as to provide a means for connecting a whiffletree to the clevis of a plow, the tug of a harness to a whiffletree, and other similar purposes; and to that end it consists in a two-part link, each part provided with an opening formed in its side to admit the adjacent link, and riveted one to the other, so that the opening shall be on opposite sides of the link, and so arranged that one of the parts can freely turn on the rivet, whereby the links are interlocked or disconnected, as will be more fully understood by the following description and claims.

Figure 1:
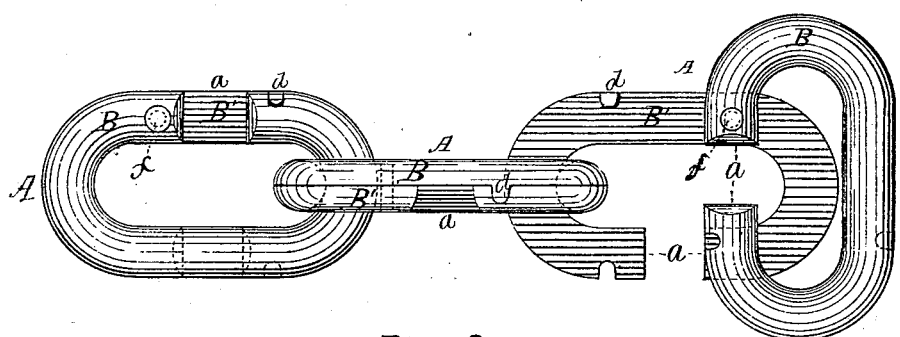
Figure 2:
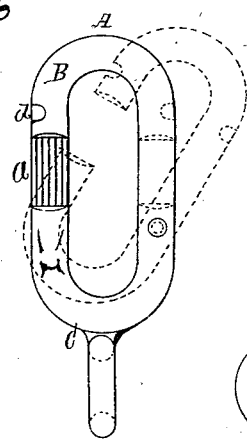
Figure 3:
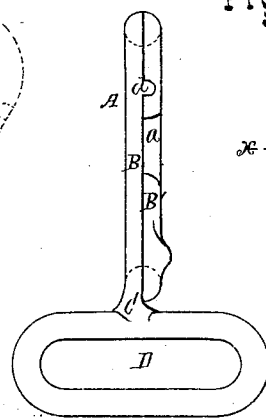
Figure 4:
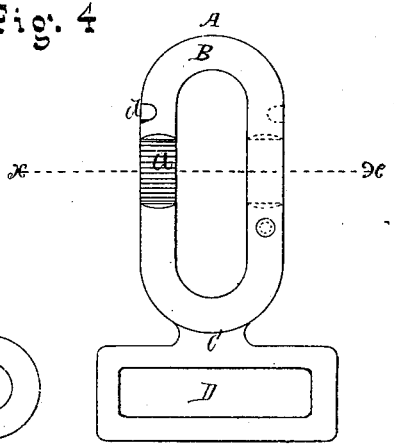
Figure 5:

In the drawing, Figure 1 is a general view of a chain embodying my said invention, with one of the links opened preparatory to the interlocking of an additional link. Fig. 2 is a side view of a snap-link embodying my said invention. Fig. 3 is an edge view of the same. Fig. 4 is a side view of a cock-eye embodying my invention; and Fig. 5 is a cross-section of the same, taken on the line $x\ x$ drawn across Fig. 4.

Similar letters of reference indicate like parts in the several figures of the drawing.

In the separate figures, A represents the link proper, which is made of any suitable metal, either wrought or malleable, and of the requisite size to insure the proper strength. The link proper is made in two parts, B B', as shown in Figs. 1, 3, and 5. These parts are of equal size, and so arranged as to fit closely together, and are each provided with an opening, $a$, formed through one of its sides at a point near the center of the same. The size of these openings are such as to allow the adjacent link to pass freely through them, and are so located in each separate part that, when the faces of the latter are placed together, the openings through the parts will be on opposite sides of the link. One of the parts, B', is provided with a lug or projection, $f$, formed as a part of the same, and arranged upon its unbroken side to match and pass through an aperture formed through the adjacent part B', at a point near opening $a$ of the latter. This projection is made round, and is riveted against the outer surface of the part B, by which means the two parts are connected together, and in such a manner as to allow the part B to freely turn on the rivet.

The object of making this rivet as a part of one of the sections, and passing it through the adjacent section near the opening, is to leave both without perforations in their unbroken sides, and thus insure uniform strength of the two sections when secured together, the perforations near the openings counting for the openings themselves, as far as their weakening agency is concerned.

Each of the parts B B' is provided with lugs $d\ d$, located at a point near opening $a$ of the adjacent part, as shown in the several figures of the drawings. These lugs are adapted to fit into a corresponding notch formed in the adjacent part near the opening, the object of which is to prevent the ends of the parts adjacent to the opening from springing outward when the link is subjected to a heavy strain.

In using my invention as a snap-link or cock-eye, and for other similar purposes, I provide one of the parts of the link proper with a shank, C, through which the eye D is formed to receive the strap, as shown in Figs. 2, 3, and 4.

To interlock one link into another, or to connect it to the ring or part where it is to be used, one of the parts is turned on the pivot so as to remove it from over opening $a$ in the adjacent part, as shown at E, Fig. 1. The adjacent link or ring is then passed through opening $a$, when the part previously turned is again turned back to its normal position, allowing the link or ring to pass through opening *a* of the same, and the link is secured.

Having thus described my invention, I claim—

The link A, made in two parts, B B', each part provided with the opening *a* to admit the adjacent link, and connected one to the other by the lug *f*, located at the side of the part B', and made as a homogeneous part of the same, and adapted to pass through the part B near opening *a*, forming a pivot on which the latter can freely turn, as specified.

WILLIAM A. INGALLS.

Witnesses:
JOHN H. WHIPPLE,
N. H. SHERBURNE.